United States Patent [19]

Brouwer

[11] 4,284,186
[45] Aug. 18, 1981

[54] UNSCRAMBLING CONVEYOR

[75] Inventor: Gerald A. Brouwer, Grandville, Mich.

[73] Assignee: Lear Siegler, Inc., Grand Rapids, Mich.

[21] Appl. No.: 49,318

[22] Filed: Jun. 18, 1979

[51] Int. Cl.³ .................. B65G 47/24; B65G 13/07
[52] U.S. Cl. .................................. 198/415; 198/416;
198/443; 198/456; 198/784; 198/786; 198/790
[58] Field of Search ............... 198/416, 443, 456, 579,
198/780, 784, 786, 789, 790, 791, 415, 633, 636,
836; 271/251

[56] References Cited

U.S. PATENT DOCUMENTS

| 1,192,832 | 7/1916 | Sherman | 198/416 X |
|---|---|---|---|
| 1,321,303 | 11/1919 | Haldeman | 198/415 |
| 1,883,889 | 10/1932 | Farley | 198/416 |
| 1,929,707 | 10/1933 | Mojonnier | 198/836 |
| 2,586,523 | 2/1952 | Dudley | 198/636 X |
| 2,706,034 | 4/1955 | Russell et al. | 198/836 |
| 3,240,311 | 3/1966 | Hofer et al. | 198/443 |
| 3,508,642 | 4/1970 | Standley et al. | 198/836 |
| 3,527,336 | 9/1970 | Johnston | 198/836 X |
| 3,666,077 | 5/1972 | Marshall | 198/636 X |
| 4,039,074 | 8/1977 | Maxted | 198/456 |

FOREIGN PATENT DOCUMENTS 519810  2/1931  Fed. Rep. of Germany ........... 271/251

Primary Examiner—James L. Rowland
Attorney, Agent, or Firm—Price, Heneveld, Huizenga & Cooper

[57] ABSTRACT

A conveyor for sorting and arranging in single file randomly received articles is disclosed. The unscrambling device has an acticle conveying surface consisting of skewed rollers divided into a number of zones arranged in tandem along the conveyor. The rollers in each zone from infeed to discharge are driven at increasingly higher speeds with the zones overlapping in such a manner that abrupt speed changes occur in steps both lengthwise and laterally of the conveyor. The articles are biased to one side of the conveyor which side is equipped with an article contacting rail divided into segments at least some of which are inclined to impart a jostling effect to the articles.

13 Claims, 11 Drawing Figures

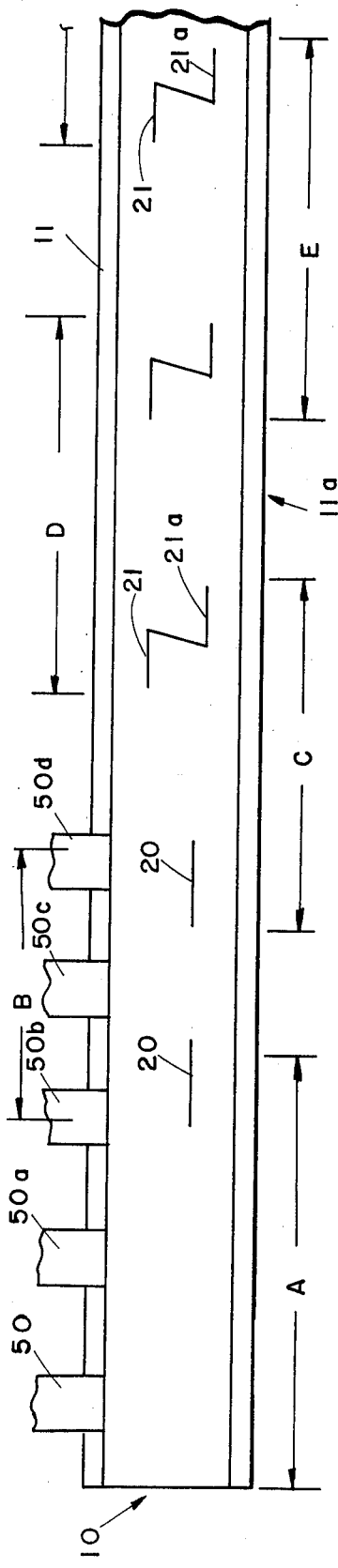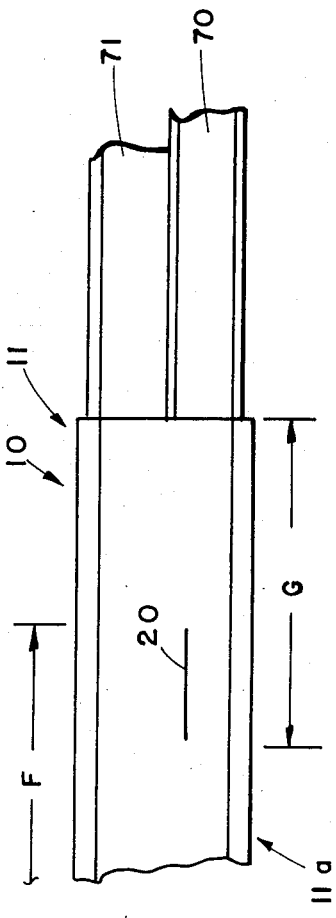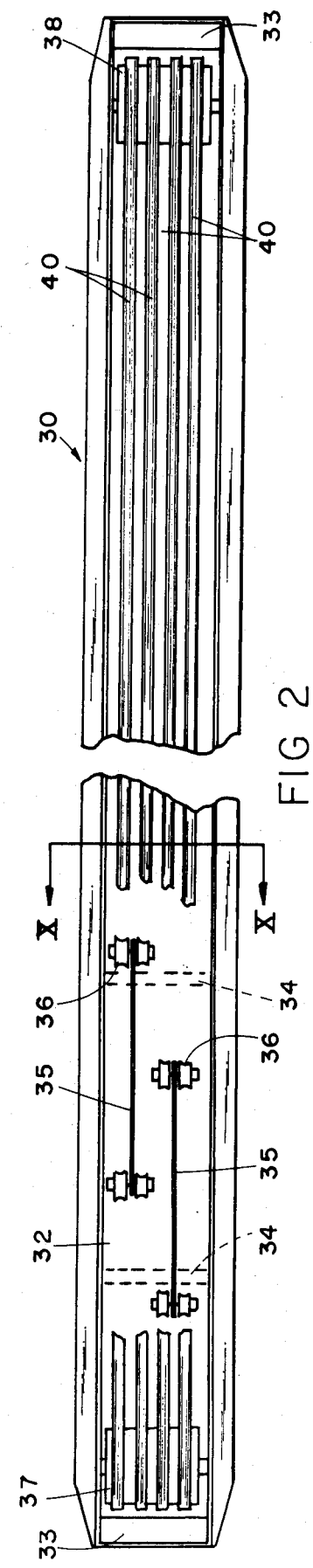

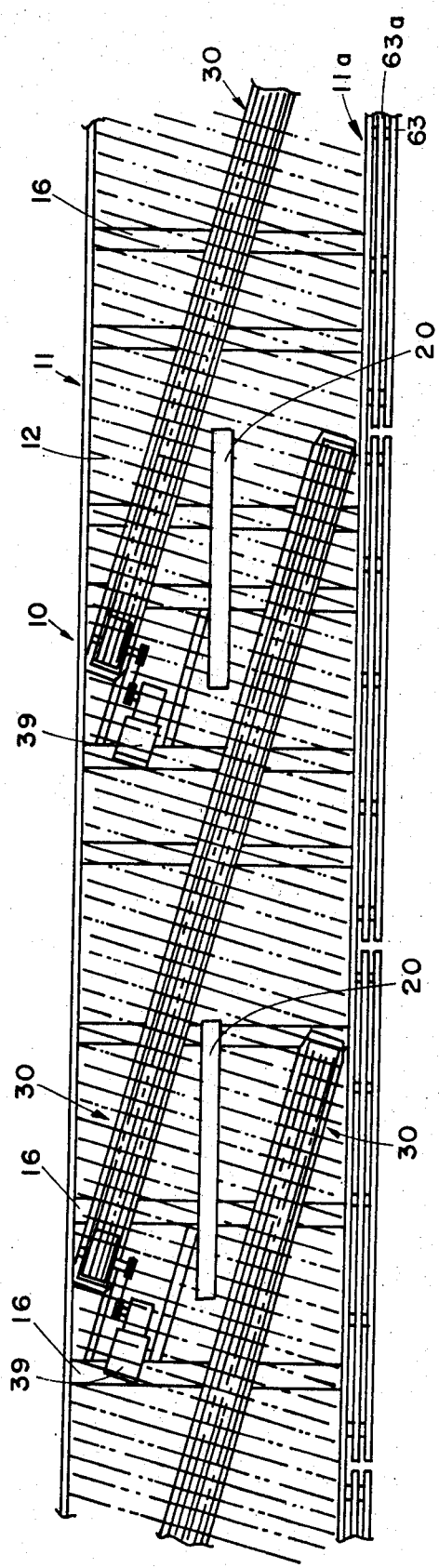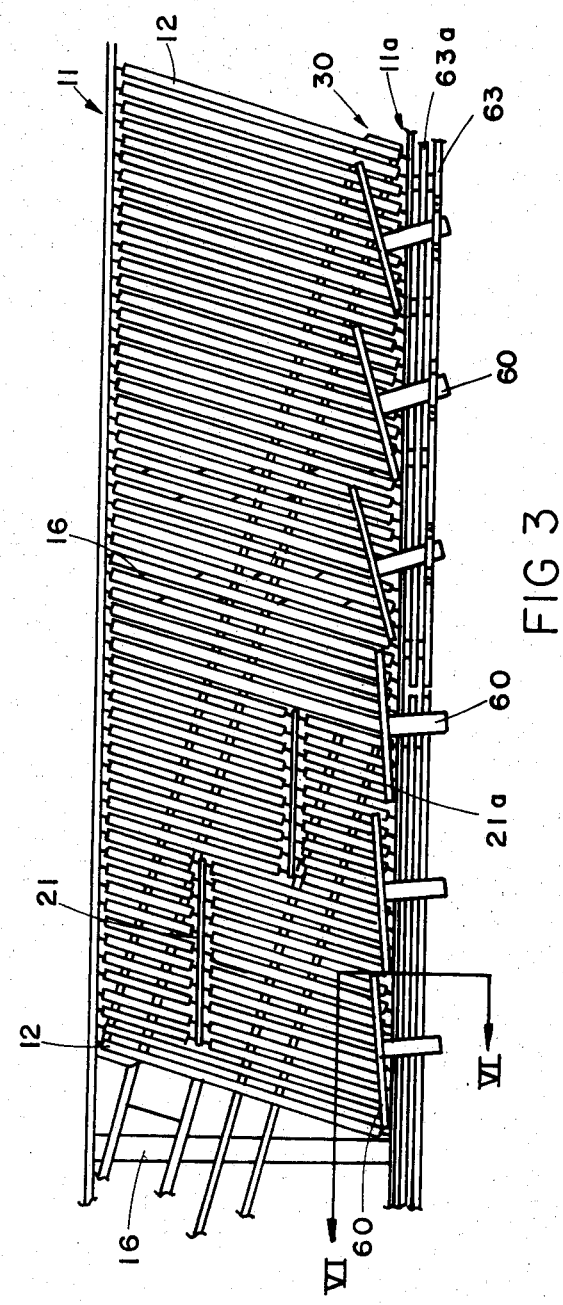

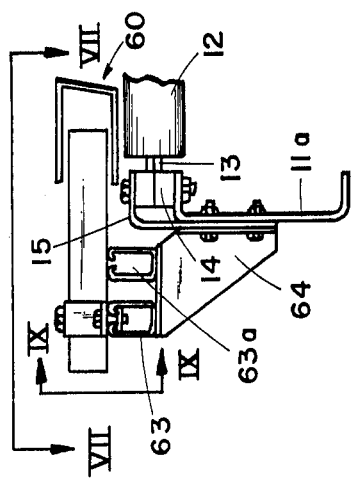
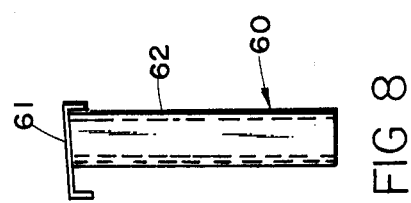
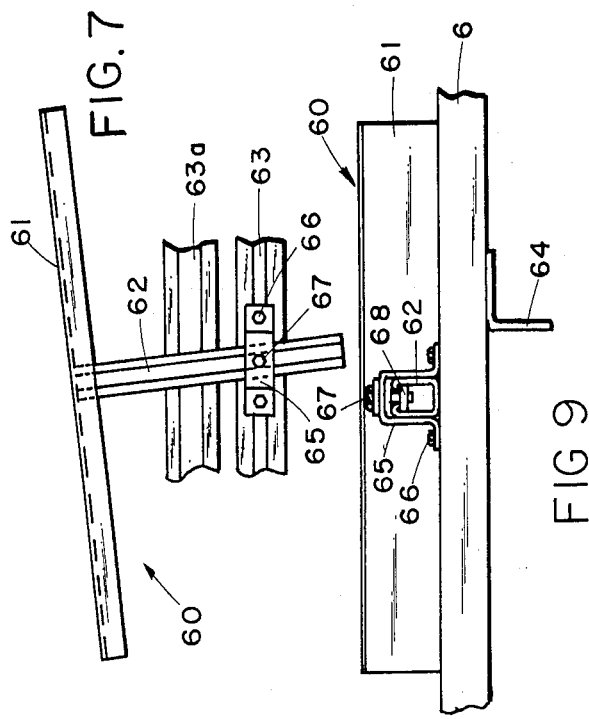
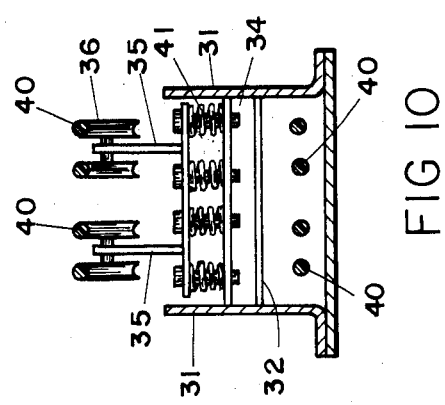
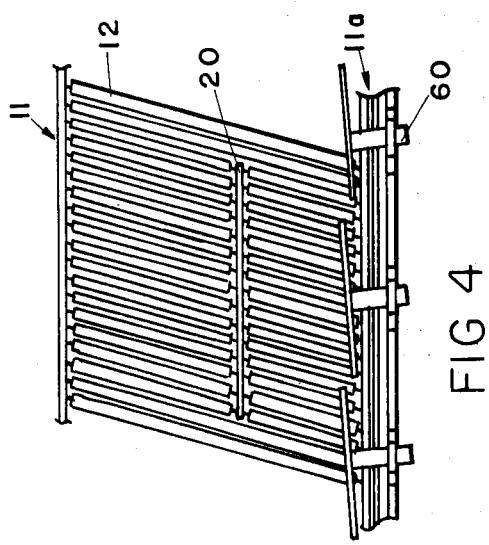

UNSCRAMBLING CONVEYOR

BACKGROUND OF THE INVENTION

In many conveyor operations, it is either desirable or necessary to sort out and arrange in single file in an oriented fashion numerous articles received in a random pattern from a number of infeed conveyors. The devices used to perform this function are referred to as unscramblers. They perform the service of sorting out the articles and automatically transferring them to one side of the conveyor where they will become aligned and will be discharged in single file. At the same time, elongated articles will be normally oriented with their greater dimension aligned in the direction of movement of the discharge conveyor. Unscramblers utilize skewed rollers to bias the articles to one side edge of the conveyor coupled with speed change zones and a high friction rail on the side toward which the articles are biased to cause the articles to become aligned and arranged in a single file. Such an unscrambler is disclosed in U.S. Pat. No. 4,039,074 entitled Unscrambler for Randomly Arranged Packages issued Aug. 2, 1977 to Wesley R. Maxted. This invention constitutes an advance in the art over the unscrambler disclosed in that patent.

BRIEF DESCRIPTION OF THE INVENTION

The invention provides an unscrambler having a plurality of zones each equipped with skewed rollers. The rollers in each zone are driven at a different speed. The speeds at which the rollers are driven increases progressively from the infeed to the discharge end. The line of lengthwise demarkation between zones is parallel to the side rails, creating an elongated overlap. The side toward which the articles are biased by the skewed rollers is equipped with a rail against which the articles ride when they have moved to that side of the conveyor. Causing the articles remote from the rail to pass around those contacting the rail is necessary to permit the unscrambler to arrange the articles. In this invention, this rail is divided into segments which may be inclined to the lengthwise axis of the conveyor to cause jostling of the articles. This expedites both their alignment and facilitates the passage of one article around another. The jostling also has the effect of eliminating hang up between articles which have projections normally causing one article to hang up on another. The overall result is an unscrambler having the capacity to accurately handle, arrange and discharge in single file alignment a large number of articles at high speeds with the overall length of the unscrambler being substantially less than has heretofore been possible to accomplish the same volume. Further, the invention provides an unscrambler which has a reduced failure rate, that is, a greater percentage of the articles are effectively oriented and aligned. The invention eliminates a retardation rail having a high friction surface. This is desirable because experience with existing unscramblers utilizing a high friction retardation rail has proven that such rails are a problem because the articles passing through the conveyor tend to rapidly polish the rail, thus, reducing its efficiency.

BRIEF DESCRIPTION OF THE DRAWINGS

FIGS. 1 and 1A are schematic plan views of an unscrambler incorporating this invention; and FIG. 2 is an enlarged, plan view of the drive frame for one of the zones of the unscrambler; and FIG. 3 is a fragmentary, enlarged plan view of a typical zone of the unscrambler including an overlap zone having a double separator frame; and FIG. 4 is a fragmentary, enlarged plan view of a zone overlapping a portion of the unscrambler having a single separator frame; and FIG. 5 is a fragmentary plan view of portions of several zones of the unscrambler with the rollers indicated in phantom for clarity; and FIG. 6 is a fragmentary, sectional view taken along the plane VI—VI of FIG. 3; and FIG. 7 is a fragmentary plan view taken along the plane VII—VII of FIG. 6; and FIG. 8 is a side, elevational view of one of the rail segments; and FIG. 9 is a fragmentary, elevational view taken along the plane IX—IX of FIG. 6; and FIG. 10 is a sectional, elevational view of the drive frame taken along the plane X—X of FIG. 2.

DESCRIPTION OF THE PREFERRED EMBODIMENT

The numeral 10 refers to a conveyor having side frame members 11 and 11a. Mounted between the side frame members are a plurality of rollers 12 which form the article supporting and transporting surface for the unscrambler. In FIGS. 1, 1A and 5, these rollers are schematically illustrated for the sake of clarity. The rollers are of conventional construction having a shaft 13 at each end about which the roller is free to rotate (FIG. 6). The ends of the shafts are mounted in suitable support bearings 14 seated on the side frame members 11 and are held in place by a bearing cover 15. The rollers 12 are skewed with respect to the side frame members and arranged to be convergent with the side frame member 11a upstream of the direction of article movement over the unscrambler. Beneath the rollers 12 the side frame members 11 and 11a are rigidly tied together by the cross members 16.

The rollers 12 are arranged in zones which are designated in FIGS. 1 and 1A as zones A-G. Lengthwise of the conveyor each zone overlaps an adjacent zone. In the area of overlap, the rollers are split or segmented, that is, the rollers do not extend the full width of the conveyor, the conveying surface being formed by two aligned roller sections, each capable of independent operation. Where the rollers are divided or split, the conveyor is provided with a separator frame 20 or a pair of separator frames 21 and 21a, depending upon the design of the zone overlap. In the case where only a single separator frame 20 is required, the frame preferably is positioned closer to the side frame 11a than to the side frame 11. Where a pair of the separator frames 20 and 21a are utilized, the end of the upstream one of the separator frames 21 is located in the same gap between a pair of the rollers as the upstream end of the downstream one of the separator frames 21a. As indicated in FIGS. 1 and 1A, because of the skewed arrangement of the rollers, this gives the boundary between the overlapping zones the appearance of a "Z." However, it must be understood that where these zones overlap, there is no continuous roller extending the full width of the conveyor surface. The separator frames 20, 21 and 21a are rigidly supported from underneath on the cross member 16. This support is not illustrated since it is conventional and any one of a number of conventional structures well known to the conveyor art can be used for this purpose.

The rollers 12 in each zone are separately powered from the rollers in each adjacent zone. Thus, the driving means for the rollers in zone A is separate from the driving means for the rollers in zone B. The same is true of each of the other zones C through G. Because the rollers 12 in each zone are skewed with respect to the side frames 11 and 11a, it is necessary that the driving means for the rollers also be skewed so that the contact between the driving belts is at a right angle to the axis of the rollers. Any other arrangement would result in excessive wear.

To drive the rollers in each zone, a separate drive frame assembly 30 is provided. The drive frame assembly 30 consists of a pair of upstanding side members 31 between which is mounted a plate 32 (FIGS. 2 and 10). The sides 31 are tied together by end pieces 33 and suitable intermediate supports 34. Mounted on the plate 32 are vertically floating supports 35, each of which has a pair of drive belts supporting pulleys 36 at each end. At one end, each of the drive frames has a drive pulley 37 and an idler pulley 38 at the other end. A power source 39 (FIG. 5) is provided for each individual drive frame 30. Trained over the pulleys 37 and 38 are four, spaced, drive belts or bands 40. Between the end pulleys 37 and 38, at suitable intervals, the drive belts are supported by the floating supports 35 through the pulleys 36. Since the supports float vertically and are resiliently supported on springs 41, the pulleys support the belts upwardly with sufficient force to assure positive driving contact with the rollers 12.

As illustrated in FIG. 1, the unscrambler has seven zones identified by the letters A through G. The number of zones is dependent upon the length of the unscrambler, the volume it is designed to handle and, to some extent, the circumstances under which it will be used. Each zone has its own separate drive frame 30. Since the drive frame must be normal to the axis of the rollers, their maximum length is governed by the width of the conveyor as is indicated in FIG. 5. The wider the conveyor, the longer each drive frame can be. However, for reasons of space requirement and cost, it is important to keep the width of the conveyor to a minimum. However, the length of the individual articles in part governs the length of the individual drive frames because it establishes a minimum length which must be used. Another governing factor is the angle at which the rollers are skewed. The greater this angle, the shorter the drive frame assembly for a given conveyor width. Thus, roller angles in excess of 15° are normally not practical because either the drive frame must be shortened or the conveyor width increased.

The equipment normally receives articles from several infeed conveyors such as the conveyors 50 and 50a, b, c, d (FIG. 1A). These are illustrated as discharging into zones A and B. The infeed could be limited to zones A or could be extended to zones in addition to A and B. Because the equipment is an unscrambler, it is not necessary to regulate or coordinate the rate of discharge of articles from these infeed conveyors. Progressively from infeed to discharge end, the rollers 12 in each individual zone are driven at a progressively higher speed. Exemplary of this, in zone A the rollers are driven at 20 feet/min., in zone B, at 58 feet/min., in zone C, at 93 feet/min., in zone D, at 138 feet/min., in zone E, at 188 feet/min., in zone F, at 255 feet/min. and in the last zone G, the drive is 400 feet/min. In the initial and lower speed zones, the length of the overlap, such as between zones A and B, is less than the length of the overlap of each of the following zones. In the upstream, slower moving zones, a single separator frame is used so there is only a single overlap area, whereas in the intermediate zones, a pair of the separator frames 21 and 21a are used. In the overlap between the next to the last and the final or discharge zones F and G, a single separator frame 20 is used because at this point, for all practical purposes, all of the articles have either reached their alignment position or are so close to it that the double frame, double overlap arrangement will not perform any significantly useful service.

Throughout the length of the unscrambler, along the side toward which the skewed rollers bias the articles, a retard rail is provided above the side frame 11a and the surface of the rollers 12. This rail is divided into a plurality of segments 60 which overlie the rollers. The length of each segment 60 is governed by the average length of the articles to be handled by the conveyor. The preferred length is approximately twice the length of the article. When articles of various lengths are involved, the length of the segments is normally an average of the article lengths.

Each segment 60 is generally T-shaped, having a rail portion 61 and a support leg 62. As best shown in FIG. 8, the face of the rail portion is downwardly and outwardly inclined at a slight angle. This minimizes article contact. To support the rail segments 60, a pair of support bars 63 and 63a are mounted along the conveyor externally of the side frame 11a by means of brackets 64 (FIG. 6). The segments 60 are secured to the outer support bar 63 by an anchor bracket 65. The anchor brackets are secured to the outer support bar by suitable bolts 66. The size of the brackets 65 is such that the supporting leg 62 not only can slide through the bracket but, parallel to the surface of the support bars, it can be pivoted through a substantial angle. This permits individual adjustment of each bracket. When the desired angle has been attained, the bracket is locked into position by tightening the bolt 67 which engages the anchor nut 68 (FIG. 9). The inner of the bars 63a serves as a rest for the support leg 62, thus relieving the bracket 65 of vertical twisting motion.

In the preferred arrangement, the guard rail segments 60 are arranged at varying angles along the length of the unscrambler. In those areas of each zone, except the discharge zone G, where there is no zone overlap the brackets are set at a substantial angle of inclination for the particular article with which the unscrambler is to be used. In a unit in which the rollers are skewed at 15° to the side rails, the rail segments 60 are normally set at a preferred angle of 15° to the side rails. However, under certain circumstances this can be decreased or increased up to about 30°. In the areas of zone overlap, the angle at which the segments are positioned is decreased for reasons which will be explained. In the final or discharge zone G, the segments have little or no angularity and in a preferred arrangement they are arranged in tandem forming a continuous straight rail.

It will be understood that the angular position at which each of the segments is positioned is such that its downstream end projects further out over the rollers than the upstream end. The purpose of so positioning the individual segments is to cause jostling of the articles. This has several desirable effects. It tends to break up any combinations of articles which resist separation. It also serves the purpose of separating articles which otherwise become interlocked or hooked together and thereby travel in groups resisting rearrangement in a single file pattern. The jostling also materially reduces the length of unscrambler necessary to sort, arrange and align a given number of articles.

The greater the inclination of the rollers with respect to the side members, the greater the bias applied to the articles to line up along one side in suitable, single file pattern. However, as the angularity of the rollers increases, the length of the rollers also increases and such an arrangement quickly becomes economically prohibitive. Further, it has been found from past experience that simply attempting to provide a drag on the articles by using a guard or retard rail with a high friction surface is not effective from the standpoint of durability because the sliding movement of the articles along the rail rapidly reduces the degree of frictional resistance to article movement and ultimately results in a polished surface with little or no resistance. By separating the rail into a plurality of segments and setting each segment at an angle, as has been described, the effect is the same as if the rollers were arranged at an inclination which is a combination of their angle to the side frames plus the angle of inclination of the individual segments. Thus, if the rollers are skewed at 15° and the segments are also set at 15°, the result is the same as if the rollers were inclined at 30° to the side rail members but without requiring the roller length necessary for such an angular relationship. It will be seen that if the rollers are set at 15° and the segments are set at 30°, the result is basically the same as if the rollers had been skewed at 45°.

Because of the angular position of the segments, they tend to retard, pivot and jostle the individual articles. They also tend to retard the movement of the articles which have already shifted to the collection or bias side of the conveyor thus facilitating and accelerating the by-passing of articles further out on the conveyor so that they will be in a position to be swept in against the bias or guard rail side of the conveyor. In the zones where there is an overlap and thus a translation of speeds, the angularity of the segments is preferably reduced because in this zone the speed differential between the overlapping portions of the rollers rather than the retardation of the articles on the bias side of the conveyor is relied upon to effect reorganization and alignment of the articles.

The use of the dual lines of separation such as between zones C and D or D and E has an accelerating effect upon the equipment's ability to sort and align the articles. By having an abrupt speed change which occurs across a significant portion of the width of the conveyor surface, the outer or slower articles are suddenly accelerated. This helps to speed up the passage of the outer articles around the inner articles. Since the outer articles are accelerated, they are moved ahead of the adjacent inner articles and thus their inward movement toward the bias side of rail 11a is no longer prevented by the inner articles.

Also by providing an elongated zone of speed differential extending parallel to the sides, many articles which enter the interzone speed transition area are made to pivot and twist. This has the dual effect of by-passing slower articles and breaking up groups of articles. By providing a pair of such speed transition areas at the interzone boundaries, these effects are repeated at each zone change, again increasing the effectiveness of the equipment per unit of length. This has the effect of decreasing the required length of the equipment.

As appears in FIG. 1, the final or discharge section G discharges onto two conveyors 70 and 71. The conveyor 70 receives those articles which have been sorted, aligned and oriented single file. The other conveyor 71 is designed to receive those few articles which, for one reason or another, the unscrambler failed to align and arrange in a single file pattern. Conveyor 71 is a recycling conveyor which returns the articles it receives to the unscrambler to be recycled.

The double overlaps with their three sharply defined areas of speed change provide multiple points of abrupt acceleration of one group of articles over another rather than a progressive acceleration laterally of the conveyor. This has proven to be more effective in breaking up clusters of articles and in quickly moving the most recently received articles into a position to be forced against the rail segments and, thus, oriented and aligned. The result of this is the ability to sort more articles on a shorter piece of equipment. Tests have been successful in sorting 21 inch long cartons of canned beverage at a rate of 72 cartons/minute in an overall length of 60 feet. It will be recognized that the overall length of the unscrambler will be governed by the average length of the articles to be unscrambled because the length of both the transition or overlap zones and of the zones between the overlap are largely governed by the length of the articles. It will also be recognized that the range of speeds involved as well as the speed differential occurring between any two zones can be varied substantially, depending upon the size, type and other characteristics of the articles being conveyed.

Having described a preferred embodiment of the invention, it will be recognized that various modifications of the invention may be made without departing from its principle. Such modifications are to be considered as included in the hereinafter appended claims unless these claims by their language expressly state otherwise.

The embodiments of the invention in which an exclusive property or privilege is claimed are defined as follows:

1. A conveyor for unscrambling and organizing randomly received articles, said conveyor having sides and a plurality of parallel rollers mounted between said sides with their axes skewed to the axis of said sides, said rollers forming an elongated conveying surface with the rollers upstream of the direction of article movement along said surface converging toward one side of said conveyor, an article engaging rail along said one side, said rail having a smooth article engaging surface; said rail lengthwise being divided into a plurality of separate segments; means independently and adjustably supporting each of said segments for variable angular relationship to said one side; said segments being individually movable laterally of said conveyor; means for locking each segment in a selected angular and lateral position; each of said segments being inclined at an angle to said one side with the upstream end thereof converging toward said one side, and at least some of said segments being inclined at an angle different from others of said segments.

2. A conveyor for unscrambling and organizing randomly received articles as described in claim 13 further characterized in that said rollers are arranged in zones lengthwise of said conveyor with the rollers of each zone overlapping the rollers on adjacent zone laterally of said conveyor; progressively downstream of said conveyor the rollers in each zone being driven at a higher speed than the rollers of the zone immediately upstream thereof; said segments adjacent areas where the rollers of a pair of said zones overlap being inclined at a lesser angle than the segments adjacent areas intermediate said areas of zone overlap.

3. A conveyor for unscrambling and organizing randomly received articles, said conveyor having sides and a plurality of parallel rollers mounted between said sides with their axes skewed to the axis of said sides, said rollers forming an elongated conveying surface with the rollers upstream of the direction of article movement along said surface converging toward one side of said conveyor, said surface being divided into a plurality of zones, power means for driving the rollers in each of said zones, said rollers in each zone being driven at a higher speed than the rollers in the adjacent upstream zone; an article engaging rail along said one side, said rail lengthwise being divided into a plurality of segments; means independently supporting each of said segments; some of said segments being inclined to said one side with the upstream end thereof converging toward said one side, some of said inclined segments being inclined at a greater angle than others of said segments.

4. A conveyor for unscrambling and organizing randomly received articles, said conveyor having sides and a plurality of parallel rollers mounted between said sides with their axes skewed to the axis of said sides, said rollers forming an elongated conveying surface with the rollers upstream of the direction of article movement along said surface converging toward one side of said conveyor, said surface being divided into a plurality of zones, each of said zones lengthwise overlapping each adjacent zone for a substantial portion of the length of each of said zones, said conveyor characterized in that at each of the areas of overlap a divider frame is provided spaced from both sides and extending parallel thereto creating elongated parallel portions of said conveying surface operating at different speeds, each of said portions terminating along the axis of a single roller extending the entire width of said portion; power means driving the rollers on the side of said divider frame remote from said one side of said conveyor at a greater speed than the rollers on the side of said divider frame adjacent said one side for accelerating the articles remote from said one side past the articles adjacent thereto; an article engaging rail along said one side.

5. A conveyor for unscrambling and organizing randomly received articles as described in claim 4 further characterized in that said rail lengthwise is divided into a plurality of separate segments; means independently mounting each of said segments.

6. A conveyor for unscrambling and organizing randomly received articles as described in claim 5 further characterized in that some of said segments are inclined to said one side with the upstream end thereof converging toward said one side, creating a series of steps in said one side.

7. A conveyor for unscrambling and organizing randomly received articles as described in claim 6 further characterized in that some of said inclined ones of said segments are inclined at an angle in the range of 15° to 30° to said one side.

8. A conveyor for unscrambling and organizing randomly received articles as described in claim 6 further characterized in that said segments adjacent the areas where said zones overlap are inclined at a lesser angle than the segments adjacent areas between said overlaps.

9. A conveyor for unscrambling and organizing randomly received articles as described in claim 4 further characterized in that said rail lengthwise is divided into a plurality of separate segments; means adjustably and independently mounting each of said segments; said segments by said means being adjustable as to both their angle of inclination to said one side and their spacing from said one side laterally of said conveyor.

10. A conveyor for unscrambling and organizing randomly received articles as described in claim 4 further characterized in that certain of said areas of overlap are provided with a pair of said divider frames, said frames being parallel, laterally spaced and offset lengthwise of said conveyor.

11. A conveyor for unscrambling and organizing randomly received articles as described in claim 10 further characterized in that the adjacent ends of said divider frames of said pair are common to the space between a pair of said rollers whereby the line of demarkation between said zones is Z-shaped with the line paralleling said rollers between said divider frames.

12. A conveyor for unscrambling and organizing randomly received articles as described in claim 11 further characterized in that the overlap between the first and second zones at the upstream end and between the discharge zone and the next adjacent upstream zone both have single divider frames and the overlaps between the intermediate zones have a pair of divider frames.

13. A conveyor for unscrambling and organizing randomly received articles as described in claim 4 further characterized in that a separate power means is provided for the rollers in each zone.

* * * * *